(12) United States Patent
Richardson et al.

(10) Patent No.: US 9,150,001 B2
(45) Date of Patent: Oct. 6, 2015

(54) HYBRID REINFORCEMENT STRUCTURE

(71) Applicant: Zephyros, Inc., Romeo, MI (US)

(72) Inventors: Henry E. Richardson, Washington, MI (US); Xuping Qian, Novi, MI (US); Gary Hulett, Memphis, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 14/269,262

(22) Filed: May 5, 2014

(65) Prior Publication Data
US 2014/0237941 A1    Aug. 28, 2014

Related U.S. Application Data

(63) Continuation of application No. 13/866,448, filed on Apr. 19, 2013, now Pat. No. 8,752,884, which is a continuation of application No. 12/613,862, filed on Nov. 6, 2009, now Pat. No. 8,430,448.

(60) Provisional application No. 61/112,331, filed on Nov. 7, 2008.

(51) Int. Cl.
| B60J 7/00 | (2006.01) |
| B32B 7/02 | (2006.01) |
| B62D 29/00 | (2006.01) |
| B29C 65/48 | (2006.01) |
| B32B 9/04 | (2006.01) |

(52) U.S. Cl.
CPC ............ B32B 7/02 (2013.01); B29C 65/4855 (2013.01); B32B 9/041 (2013.01); B62D 29/002 (2013.01)

(58) Field of Classification Search
CPC ...... B62D 29/002; B29C 65/00; B29C 44/18; B29C 66/1122; B29C 66/128; B29C 53/8016; C08L 21/60; C08L 2666/02; C08K 13/04; C08K 7/02
USPC .............. 296/187.02, 146.6, 187.01, 187.03, 296/187.12, 205; 264/46.6, 46.7
See application file for complete search history.

(56) References Cited

U.S. PATENT DOCUMENTS

| 5,575,526 A | 11/1996 | Wycech |
| 5,884,960 A | 3/1999 | Wycech |
| 6,058,673 A | 5/2000 | Wycech |

(Continued)

FOREIGN PATENT DOCUMENTS

| CN | 2311398 | 3/1999 |
| DE | 29812843 U1 | 7/1998 |

(Continued)

OTHER PUBLICATIONS

Japanese Office Action dated Oct. 15, 2013; Application No. 2011-535688.

(Continued)

*Primary Examiner* — Kiran B Patel
(74) *Attorney, Agent, or Firm* — The Dobrusin Law Firm, PC

(57) ABSTRACT

A structural reinforcement for insertion into a cavity of a vehicle structure including a base reinforcing portion, an expandable material and a localized reinforcement is disclosed. The localized reinforcement is placed within the structural reinforcement at a location of anticipated increased deformation during vehicle impact in an effort to reduce deformation and control the load distribution post-impact.

20 Claims, 9 Drawing Sheets

(56) References Cited

U.S. PATENT DOCUMENTS

| | | | |
|---|---|---|---|
| 6,096,403 A | 8/2000 | Wycech | |
| 6,135,542 A | 10/2000 | Emmelmann et al. | |
| 6,199,940 B1 | 3/2001 | Hopton et al. | |
| 6,253,524 B1 | 7/2001 | Hopton | |
| 6,348,513 B1 | 2/2002 | Hilborn et al. | |
| 6,368,438 B1 | 4/2002 | Chang et al. | |
| 6,378,933 B1 | 4/2002 | Schoen | |
| 6,467,834 B1 * | 10/2002 | Barz et al. | 296/187.02 |
| 6,471,285 B1 | 10/2002 | Czaplicki et al. | |
| 6,474,726 B1 | 11/2002 | Hanakawa et al. | |
| 6,478,367 B2 | 11/2002 | Ishikawa | |
| 6,523,884 B2 | 2/2003 | Czaplicki et al. | |
| 6,550,847 B2 * | 4/2003 | Honda et al. | 296/146.6 |
| 6,575,526 B2 | 6/2003 | Czaplicki et al. | |
| 6,619,727 B1 | 9/2003 | Barz et al. | |
| 6,793,274 B2 * | 9/2004 | Riley et al. | 296/187.03 |
| 6,811,864 B2 | 11/2004 | Czaplicki et al. | |
| 6,817,654 B2 | 11/2004 | Kitagawa et al. | |
| 6,890,021 B2 | 5/2005 | Bock et al. | |
| 6,896,320 B2 | 5/2005 | Kropfeld | |
| 6,920,693 B2 | 7/2005 | Hankins et al. | |
| 6,921,130 B2 | 7/2005 | Barz et al. | |
| 6,932,421 B2 | 8/2005 | Barz | |
| 6,941,719 B2 | 9/2005 | Busseuil et al. | |
| 6,953,219 B2 | 10/2005 | Lutz et al. | |
| 7,025,409 B2 | 4/2006 | Riley et al. | |
| 7,105,112 B2 | 9/2006 | Czaplicki et al. | |
| 7,114,763 B2 | 10/2006 | Riley et al. | |
| 7,125,461 B2 * | 10/2006 | Czaplicki et al. | 156/79 |
| 7,160,491 B2 | 1/2007 | Barz et al. | |
| 7,249,415 B2 | 7/2007 | Larsen et al. | |
| 7,374,219 B2 | 5/2008 | Brennecke | |
| 7,479,246 B2 | 1/2009 | Muteau et al. | |
| 7,503,620 B2 | 3/2009 | Brennecke et al. | |
| 7,690,676 B2 | 4/2010 | Jaramillo et al. | |
| 7,735,906 B2 | 6/2010 | Takahashi et al. | |
| 7,748,773 B2 | 7/2010 | Niezur et al. | |
| 7,892,396 B2 | 2/2011 | Sheasley | |
| 7,997,642 B2 | 8/2011 | Rocheblave et al. | |
| 8,029,222 B2 | 10/2011 | Nitsche | |
| 2002/0125739 A1 * | 9/2002 | Czaplicki et al. | 296/187 |
| 2003/0057737 A1 * | 3/2003 | Bock et al. | 296/188 |
| 2003/0183317 A1 | 10/2003 | Czaplicki | |
| 2004/0046421 A1 * | 3/2004 | Barz | 296/187.02 |
| 2004/0076831 A1 | 4/2004 | Hable et al. | |
| 2004/0104598 A1 * | 6/2004 | Barz et al. | 296/187.02 |
| 2004/0130185 A1 | 7/2004 | Hasler | |
| 2005/0017543 A1 | 1/2005 | Riley | |
| 2005/0035628 A1 * | 2/2005 | Behr et al. | 296/187.02 |
| 2005/0230027 A1 | 10/2005 | Kassa et al. | |
| 2006/0181089 A1 | 8/2006 | Andre et al. | |
| 2006/0188694 A1 | 8/2006 | McLeod | |
| 2007/0018483 A1 | 1/2007 | Kerscher et al. | |
| 2007/0090560 A1 | 4/2007 | Kassa et al. | |
| 2008/0029200 A1 * | 2/2008 | Sheasley | 156/79 |
| 2008/0061602 A1 * | 3/2008 | Czaplicki et al. | 296/205 |
| 2008/0156425 A1 | 7/2008 | Howe et al. | |
| 2008/0257491 A1 | 10/2008 | Czaplicki et al. | |
| 2008/0296164 A1 * | 12/2008 | Dajek et al. | 205/80 |
| 2009/0085379 A1 * | 4/2009 | Takahashi et al. | 296/193.06 |
| 2009/0220737 A1 * | 9/2009 | Kraushaar | 428/131 |
| 2010/0021267 A1 | 1/2010 | Nitsche | |
| 2011/0104413 A1 * | 5/2011 | Mendibourne et al. | 428/35.7 |
| 2011/0206890 A1 * | 8/2011 | Belpaire et al. | 428/68 |
| 2012/0118424 A1 * | 5/2012 | Cannon et al. | 138/172 |
| 2013/0133771 A1 * | 5/2013 | Richardson et al. | 138/109 |
| 2014/0165487 A1 * | 6/2014 | Mirmiran et al. | 52/408 |

FOREIGN PATENT DOCUMENTS

| | | |
|---|---|---|
| DE | 20 2004 009473 U1 | 10/2004 |
| DE | 202004009473 U1 | 11/2004 |
| DE | 102006032867 A1 | 1/2008 |
| EP | 652138 A1 | 5/1995 |
| EP | 1074457 | 2/2001 |
| EP | 1084816 A2 | 3/2001 |
| EP | 1354789 | 10/2003 |
| EP | 1435320 A2 | 7/2004 |
| EP | 1122155 B1 | 4/2006 |
| EP | 1759964 | 3/2007 |
| EP | 1759964 A1 | 7/2007 |
| EP | 2352665 B1 | 8/2014 |
| FR | 2749263 | 5/1996 |
| FR | 2749263 A1 | 12/1997 |
| JP | 04-252754 | 9/1992 |
| JP | 09-239888 | 9/1997 |
| JP | 2001048054 A | 2/2001 |
| JP | 2001-322517 | 11/2001 |
| WO | 99/37506 | 7/1999 |
| WO | 02/068258 A1 | 9/2002 |
| WO | 02/074608 | 9/2002 |
| WO | 2006/031761 A2 | 3/2006 |
| WO | 2007/082677 A1 | 7/2007 |
| WO | 2010/018190 | 2/2010 |
| WO | 2010/018190 A1 | 2/2010 |
| WO | 2010/054194 A1 | 5/2010 |

OTHER PUBLICATIONS

International Preliminary Report on Patentability dated Feb. 15, 2011 (Appl. No. PCT/EP2009/060431).

PCT Written Opinion of the International Searching Authority dated Oct. 14, 2009 (Appl. No. PCT/EP2009/060431).

Chinese Office Action dated Apr. 19, 2013; Chinese Appln. No. 200980148965.2.

Ultimate Tensile Strength dated Sep. 19, 20141 http://en.wikipedia.org/wiki/ultimate_tensile_strength.

Opposition to EP2352665; Notice of Opposition by Sika dated Jan. 8, 2014.

Opposition to EP2352665; Notice of Opposition by Henkel dated Oct. 2, 2014.

Photographs depicting structural reinforcement part og L&L Products, Inc.

Utility Model Examined Publication No. 49-13208.

Utility Model Unexamined Publication No. 57-121375.

Utility Model Unexamined Publication No. 58-59673.

Response to Communication of Notices of Opposition filed on May 28, 2015 (EP Appln. No. 09752627.1).

Sika Letter dated Jul. 9, 2015, in German & English translation regarding Opposition to Procedure (EP Appln. No. 09752627.1).

* cited by examiner

▨ Expandable Material Post - Expansion
▨ Expandable Material Pre - Expansion

HYBRID REINFORCEMENT STRUCTURE

CLAIM OF PRIORITY

The present application claims the benefit of the filing date of U.S. Provisional Application Ser. No. 61/112,331 (filed Nov. 7, 2008), the entirety of the contents of this application being hereby expressly incorporated by reference.

FIELD OF THE INVENTION

The present invention relates generally to reinforcement of structures, and more particularly to reinforcement of vehicle structures using multiple reinforcing materials.

BACKGROUND OF THE INVENTION

In recent years, considerable attention has been directed toward improving vehicle performance in the event of collisions or other impacts. One particular aspect that has been addressed has been roof crush resistance. An object of such efforts has been to increase the loads that a vehicle roof is able to withstand (e.g., during a rollover accident) and to help thereby prevent intrusion of the roof into the passenger compartment. Efforts so far largely have been in the area of metal reinforcement, such as the increased use of steel structures for reinforcement. Unfortunately to perform an effective job of structural reinforcement relatively heavy structures are needed. This has an undesired effect of increasing vehicle weight, with an attendant decrease in fuel efficiency. Thus, there is a need for structural reinforcements that provide enough support to meet the need for roof crush resistance, and other structural reinforcement applications, while avoiding the detrimental effects of increasing the weight of the vehicle roof.

In various other vehicle locations, recent years have seen the increased use of structural reinforcements in which vehicle cavities are commonly fitted with structural reinforcements that aid in controlling deformation from an impact. For some applications, it has become popular in recent years to employ a carrier structure in combination with an expandable material as part of the reinforcement. See e.g., U.S. Pat. Nos. 6,932,421; 6,921,130; 6,920,693; 6,890,021; and 6,467,834 all incorporated by reference. Typically, these carrier structures are made solely of molded polymeric materials. Some are made solely of metallic materials. As has been the case for a wide number of applications of these structures, the size and geometry of the structure may be related to the extent of load bearing that is required for the application. Often, this has been addressed by simply increasing the amount of material used for the carrier (and thus the part weight) in response to the increased need for impact resistance. Attention to controlling multiple modes of deformation within a single carrier is often only incidental, if at all.

The reinforcement and support of vehicle roof structures provides a further particular challenge, especially in view of the cavity volumes in which reinforcement of the above type is possible. By increasing the amount of material used for the carrier, it may be difficult to employ a reinforcement that is large enough to provide the requisite support but small enough to fit within the confines of certain vehicle cavities, including pillars and door sills. In addition, many new vehicle designs, particularly those related to compact vehicles, require stronger reinforcements in even smaller cavities. Traditional reinforcement structures may not be suitable, as cavity size requirements often limit the ability to add more material to the reinforcements for strength increase.

Thus, there remains a need for alternative techniques that allow for the ability to improve the support capability of a carrier while avoiding the addition of substantial weight and further avoiding the expense and time associated with additional raw materials and additional processing time. There also remains a need for a structural reinforcement that can be made in a relatively low profile shape so that it can be employed with success in smaller cavities.

SUMMARY OF THE INVENTION

The present invention meets one or more of the above needs by the improved devices and methods described herein.

In one aspect, the present invention pertains to a structural reinforcement comprising a base portion, an expandable material and a localized reinforcement. The base portion may be an elongated base reinforcing portion having a longitudinal axis. The expandable material may be an expandable polymeric material at least partially associated with the base reinforcing portion. The localized reinforcement may be a localized reinforcement aligned generally parallel with the longitudinal axis and located within a contemplated impact deformation region of the structural reinforcement. The localized reinforcement may further be made of a material that is dissimilar from and has a higher tensile strength than the material of the base reinforcing portion so that upon impact in the impact defamation region the severity of deformation is substantially reduced as compared to a part without the localized reinforcement.

This aspect may be further characterized by one or any combination of the following features. The base reinforcing portion and the expandable polymeric material may be integrally formed of the same material. The localized reinforcement may include a fastening means that fastens the localized reinforcement to a vehicle structure or to the base reinforcing portion. The fastening means may attach to any mounting bracket, a seat belt mechanism or retractor, a pull handle bracket, a roof rack, a mirror bracket, a sunroof bracket, a bumper bracket, a hinge component, a chassis mount bracket, an engine bracket, a suspension component or a radiator bracket. The localized reinforcement may be made of a metallic material selected from steel, aluminum, titanium, nickel, magnesium, an ahoy, a transition metal or any combination thereof. The localized reinforcement may be substantially completely covered by the base reinforcing portion, the expandable material, or both. The base reinforcing portion may include a curved first surface that is in contact with a curved localized reinforcement. The localized reinforcement may be a composite material. The localized reinforcement may have an outer surface and at least a portion of the outer surface may be in contact with the expandable material after expansion.

In a further aspect, the present invention contemplates a structural reinforcement comprising a base reinforcing portion having one or more extensions, an expandable polymeric material adjacent to the one or more extensions and a localized reinforcement. The base reinforcing portion may be elongated and may include a curved first surface and a longitudinal axis. The expandable material may be at least partially associated with the base reinforcing portion and the one or more extensions may cause the expandable material to expand vertically first and horizontally only after the expandable material extends beyond the height of the one or more extensions. The localized reinforcement may be aligned generally parallel with the longitudinal axis of the base portion and may be located within a contemplated impact deformation region of the structural reinforcement. The localized reinforcement may further be in contact with the curved first surface of the base reinforcing portion and may be made of a material that is dissimilar from the material of the base reinforcing portion.

This aspect may be further characterized by one or any combination of the following features. The expandable material may have a ductility ratio of about 2.5. The localized reinforcement may have a generally curved or U-shaped profile. The base reinforcing portion may be a metal part, a composite part, a polymeric part, or any combination thereof. The ductility of the base reinforcing portion material may be less than the ductility of the localized reinforcement material. The localized reinforcement may have one or more visible exposed surfaces after expansion of the expandable material. The structural reinforcement may include a top portion, a middle portion, and a bottom portion so that the localized reinforcement is only in contact with the middle portion. The base reinforcing portion, the localized reinforcement, or both, may contain a mechanical interlocking means.

In yet another aspect, the present invention contemplates a structural reinforcement comprising: a base reinforcing portion including a curved first surface and one or more extensions; an expandable polymeric material at least partially associated with the base reinforcing portion, wherein the expandable polymeric material is located adjacent to the one or more extensions such that the one or more extensions cause the expandable material to expand vertically first and horizontally only after the expandable material extends beyond the height of the one or more extensions; a localized reinforcement having a generally curved or u-shaped profile and located within a contemplated impact deformation region of the structural reinforcement, wherein: at least a portion of the outer surface is visibly exposed and in contact with the expandable material after expansion; the localized reinforcement is made of a material that is dissimilar from the material of the base reinforcing portion; the localized reinforcement is in contact with the curved first surface of the base reinforcing portion; and the ductility of the base reinforcing portion material is less than the ductility of the localized reinforcement material; a fastening means that fastens the localized reinforcement to a vehicle structure or to the base reinforcing portion.

DETAILED DESCRIPTION

Figure 1:
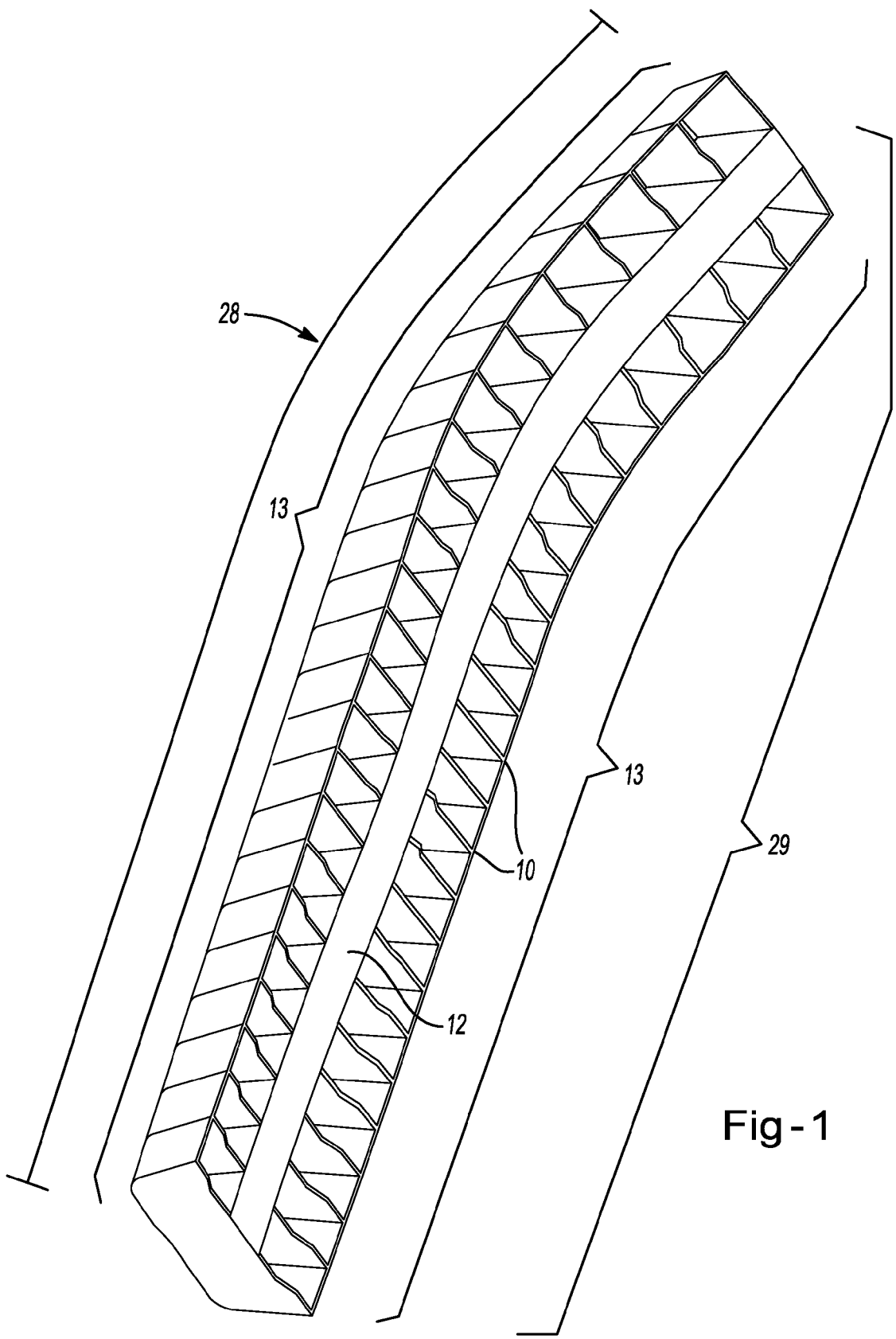
FIG. 1 is a perspective view of an illustrative reinforcement in accordance with the present teachings.

The invention herein contemplates a unique approach for providing supplementary support and reinforcement to portions of a vehicle structure that experience increased deformation during vehicle impact. The additional support is provided by including a localized reinforcement structure that, in combination with a base reinforcing portion as part of a single carrier, is capable of providing necessary support for structural reinforcement of the vehicle without adding substantial weight or cost to a vehicle. The base reinforcing portion may be made of a polymeric material and the localized reinforcement may be made of a metallic material. The resulting structure may weigh less than a reinforcing structure made entirely of metallic material. The resulting structure may also weigh less and/or costs less than a reinforcing structure made entirely of polymeric material (e.g., a polymeric reinforcing structure that provides support equal to that of the reinforcement of the present invention). The structural reinforcement of the present invention is capable of providing additional support to the roof structure or other cavities of a vehicle without adding substantial unwanted weight.

By placing structural reinforcements within vehicle cavities, the force of an impact is absorbed and dissipated by the structural reinforcement. In the event that the force of the impact is too great, the material of the structural reinforcement may crack, bend or break. By providing the localized reinforcement disclosed herein within a structural reinforcement, any impact that involves more force than the base reinforcing portion is capable of withstanding will cause a multiple stage deformation. The force of an impact may come into first contact with the base reinforcing portion. Once the force exceeds the strength capability of the base reinforcing portion, the force will be transferred to the localized reinforcement as opposed to causing breaking or cracking of the base reinforcing portion. This multiple stage deformation sequence may include further means to control the effects of impact force on the structural reinforcement. For example, the addition of an expandable material as disclosed herein may add an additional level of support for preventing any cracking or breaking of the base reinforcement portion.

As discussed herein, a localized reinforcement may be placed in contact with a base reinforcing portion. The localized reinforcement may be placed at a location on the base reinforcing portion that experiences increased deformation during impact to reduce the deleterious effects of the impact on the vehicle. The localized reinforcement may also span the entire length of the base reinforcing portion in the event that the entire base reinforcing portion experiences increased deformation during impact. The localized reinforcement may be an elongated structure that is made of a material that is dissimilar to that of the base reinforcing portion. The base reinforcing portion may also be an elongated structure having a longitudinal axis and the localized reinforcement may be aligned in a generally parallel relationship to the longitudinal axis of the base reinforcing portion. The localized reinforcement may act to bisect the base reinforcing portion, such that the localized reinforcement is aligned in a parallel manner with one or more rib structures running transverse to the longitudinal axis and/or one or more rib structures running substantially parallel to the longitudinal axis on either side of the localized reinforcement. The localized reinforcement may be attached to the base reinforcing portion via a fastener and/or an adhesive. It may be held in place by attachment, compressive forces, friction, adhesion, or any combination thereof. The localized reinforcement may include multiple layers of the same material, or multiple layers of dissimilar materials. The layers may further include adhesives and/or expandable materials disposed between the layers. The layers may also be fastened to one another, to the base reinforcing portion, to any adhesive or expandable material, or any combination thereof.

The localized reinforcement may be insert-molded such that the localized reinforcement is inserted into a location and molten material is applied over and around the localized reinforcement. The localized reinforcement may be co-extruded with the base reinforcing portion material, the expandable material, or both. The localized reinforcement may also be attached to the base reinforcing portion via a fastening means or adhesive. After attachment, the localized reinforcement may extend along the entire length of the base reinforcing portion or alternatively it may extend along up to about 25% of the length of the base reinforcing portion, up to about 50% of the length of the base reinforcing portion, or even up to about 75% of the length of the base reinforcing portion. It may extend greater than about 25% or greater than about 50% of the length of the base reinforcing portion. The localized reinforcement may extend along a width of the base reinforcing portion. The localized reinforcement may extend along the entire width of the base reinforcing portion or alternatively it may extend along up to about 25% of the width of the base reinforcing portion, up to about 50% of the width of the base reinforcing portion, or even up to about 75% of the width of the base reinforcing portion. It may extend greater than about 25% or greater than about 50% of the width of the base reinforcing portion.

Upon insertion of the localized reinforcement onto the base reinforcing portion, the localized reinforcement may have one or more exposed surfaces (e.g., surfaces that are not concealed by the base reinforcing portion). The localized reinforcement may also be located within the base reinforcing portion so that substantially all of the localized reinforcement is covered by the base reinforcing portion (e.g., the localized reinforcement has no exposed surfaces). After expansion of the expandable material, the localized reinforcement may continue to have one or more exposed surfaces (e.g., surfaces that are not covered by the expandable material or the base reinforcing portion). An outermost surface of the localized reinforcement may be generally co-planar or contiguous with the base reinforcing portion. An outermost surface of the localized reinforcement may project beyond and/or be recessed relative to the base reinforcing portion over at least a portion of its length.

The localized reinforcement may include one or more walls, and preferably at least two adjoining walls that are angularly offset from each other. The one or more walls of the localized reinforcement may be substantially planar or may be curved. The localized reinforcement may include both walls that are planar and was that are curved. The was of the localized reinforcement may follow and match the corresponding walls of the base reinforcing portion (e.g., the walls of the localized reinforcement are in contact with one or more was of the base reinforcing portion so that the angles and/or curvature are complementary). The base reinforcing portion may include a first surface, an opposing second surface and at least one side wall. The first surface may include one or more ribs. The second surface may include one or more ribs. The one or more side walls may include one or more ribs. The ribs may extend in a substantially transverse direction in relation to the longitudinal axis of the base reinforcing portion. The ribs may extend in a substantially parallel direction in relation to the longitudinal axis of the base reinforcing portion. The base reinforcing portion may include a first portion and a second portion, such that the first portion does not contact the localized reinforcement and the second portion contacts the localized reinforcement. The base reinforcing portion may include multiple first portions. The base reinforcing portion may include at least two first portions, each adjoining a terminating end of a second portion. One or more of the at least one side wall may include at least a portion of the localized reinforcement.

The localized reinforcement may be a steel reinforcement. The localized reinforcement may also be composed of aluminum, extruded aluminum, aluminum foam, magnesium, magnesium alloys, molded magnesium alloys, titanium, titanium alloys, molded titanium alloys, nickel, copper, transition metals, polyurethanes, polyurethane composites, or any combination thereof. The material of the localized reinforcement is selected so that the tensile strength and modulus of the localized reinforcement may be higher than that of the base reinforcing portion and/or expandable material. The tensile strength of the localized reinforcement material may be at least about 1.2 times the tensile strength of the base reinforcing portion material. The tensile strength of the localized reinforcement material may be at least about 2 times that of the base reinforcing portion material, or even 5 times that of the base reinforcing portion material. The material of the localized reinforcement may also have increased thermal conductivity as compared to that of the base reinforcing portion. It may have a flexural modulus of at least 1.2.

The material used for the localized reinforcement may be as thin as about 0.5 mm. The wall thickness of the localized reinforcement material may be greater than about 0.5 mm. The wall thickness of the localized reinforcement material may be less than about 3.5 mm. The wall thickness of the localized reinforcement material may be about 1.5 mm. The wall thickness may vary at different points along the localized reinforcement, or may remain constant along the entire profile of the localized reinforcement. The localized reinforcement may have at least two non-planar walls. The localized reinforcement may have three or more walls and may also have a substantially curved or U-shaped profile. The profile of the localized reinforcement may be constant along the localized reinforcement or variable. The walls of the localized reinforcement may create a cavity and that cavity may contain rib structures and/or expandable material.

The base reinforcing portion may be made of a suitable polyimide (e.g. Nylon) or other polymeric material. The base reinforcing portion may be injection molded, extruded, die cast, or machined comprising materials such as polysulfones, polyamides (e.g., Nylon, PBI, or PEI), or combinations thereof. The base reinforcing portion may also be selected from materials consisting of aluminum, extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC. The base reinforcing portion may be injection molded or extruded. The polymeric material may be filled or otherwise reinforced. For example, it may include a glass reinforced polymeric material.

Figure 2:
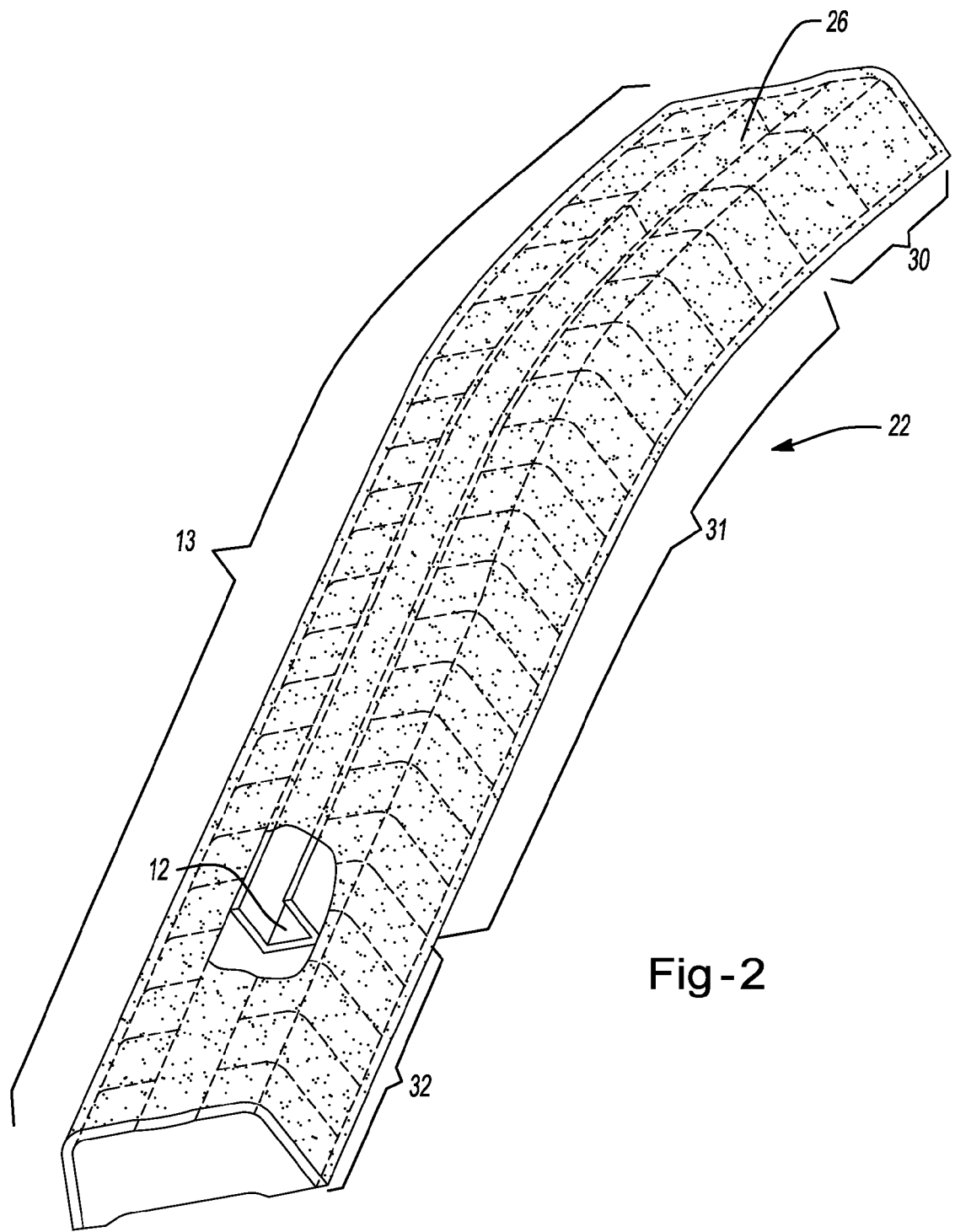
FIG. 2 is a bottom view of the reinforcement of FIG. 1.
Figure 3:
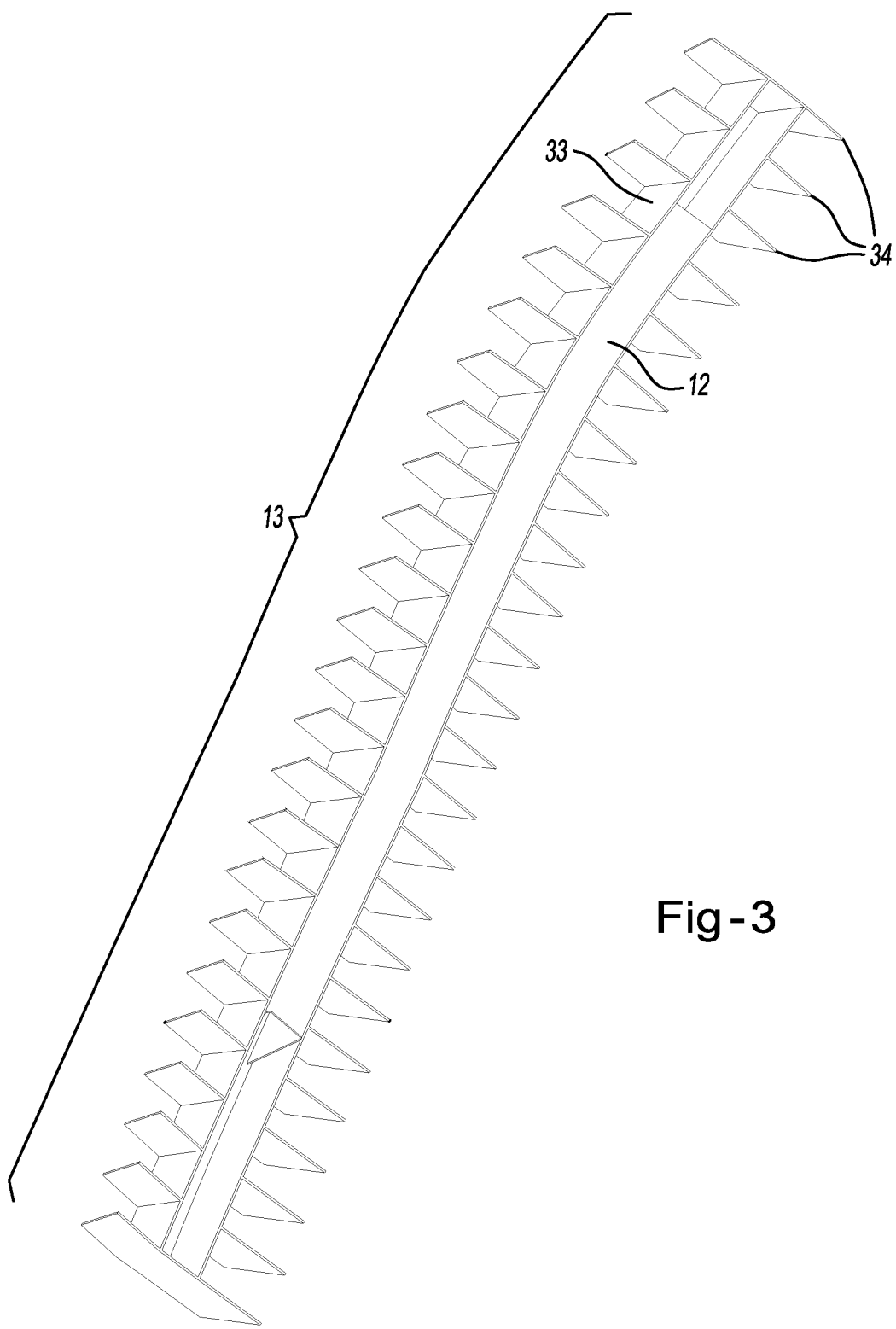
FIG. 3 is a skeleton view of the reinforcement of FIG. 1.

As illustrated in FIGS. 1-3, the present invention provides a localized reinforcement 12 into a contemplated impact deformation region 36 on a base reinforcing portion 13 as part of a single carrier 29 (the base reinforcing portion having a longitudinal axis 28 and a first curved surface 33) such that the localized reinforcement material is different from the base reinforcing portion material of the structural reinforcement

50. The area of the base reinforcing portion fitted with the localized reinforcement may experience reduced deformation as compared to the portions of the base reinforcing portion that are not fitted with any localized reinforcement. The reinforcement structure may include a first surface 22 and a second surface 23. The localized reinforcement may be placed so that it contacts only the first surface (as shown for example in FIG. 2). The first surface may include a recessed area 26 having one or more walls for containing the localized reinforcement. The was of the recessed area may be substantially planar as shown for example in FIGS. 2 and 3, or may be curved. The structural reinforcement 50 including a top portion 30, a middle portion 31, and a bottom portion 32 so that the localized reinforcement 12 is only in contact with the middle portion. As shown in FIG. 3, the base reinforcing portion includes one or more extensions 34 extending therefrom.

Figure 4:
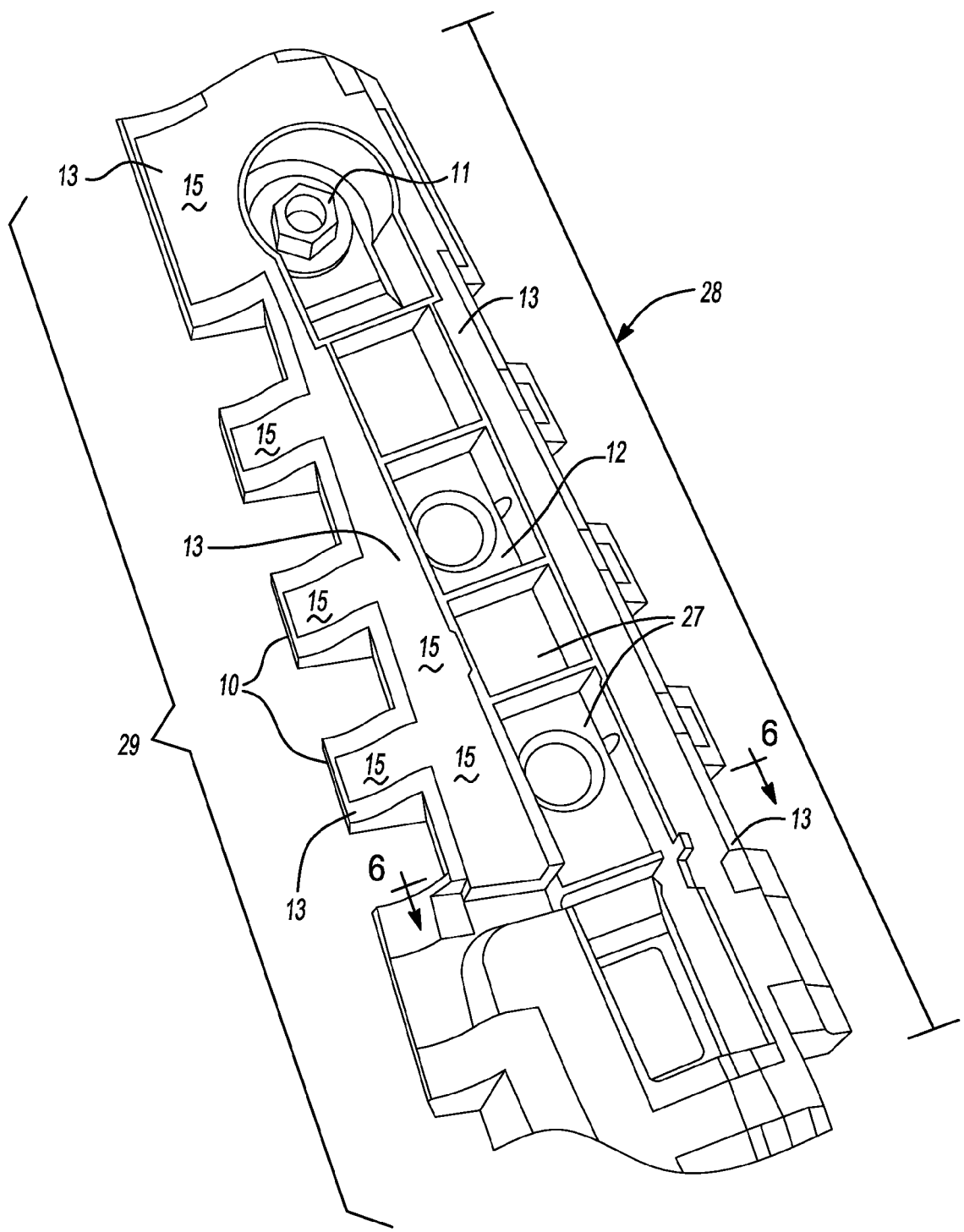
FIG. 4 is a perspective view of a portion of an illustrative reinforcement in accordance with the present teachings.
Figure 5:
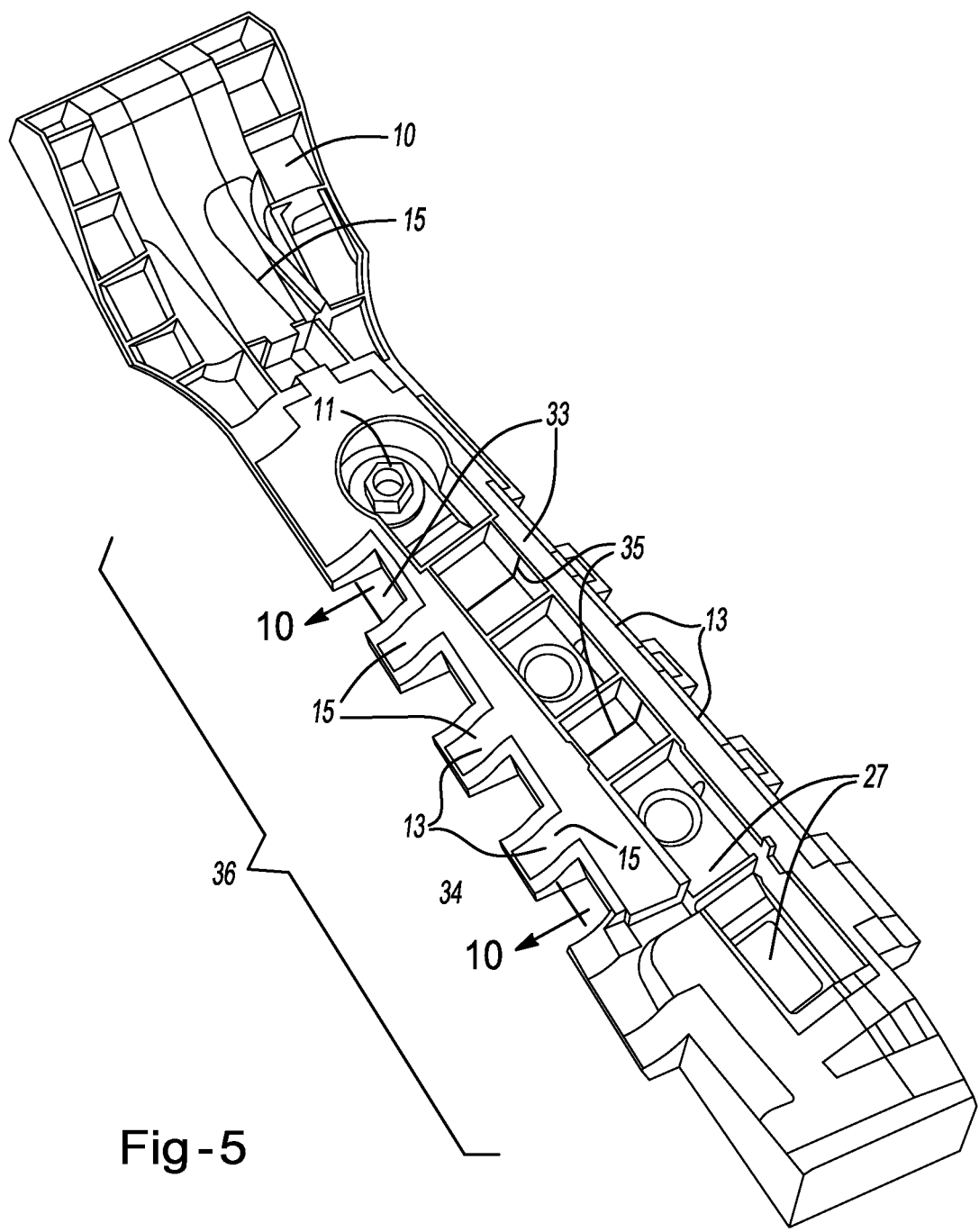
FIG. 5 is a perspective view of an illustrative reinforcement in accordance with the present teachings.
Figure 6:
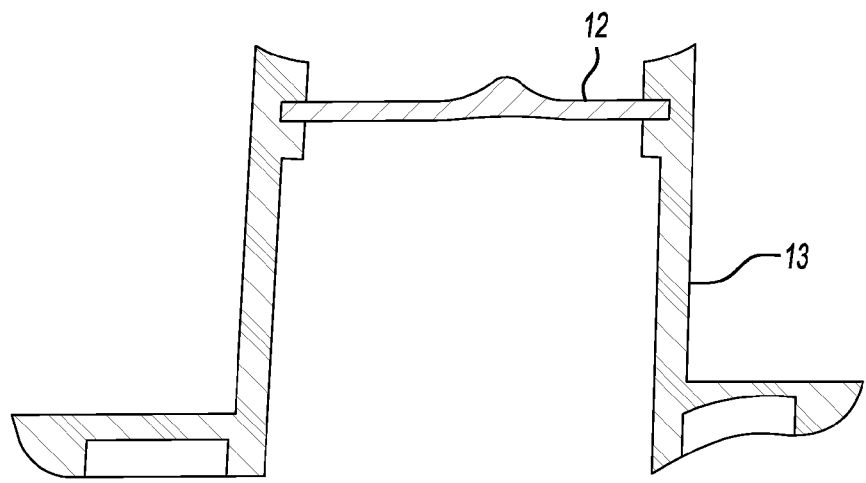
FIG. 6 is a cross-section view of the reinforcement of FIG. 5.
Figure 7:
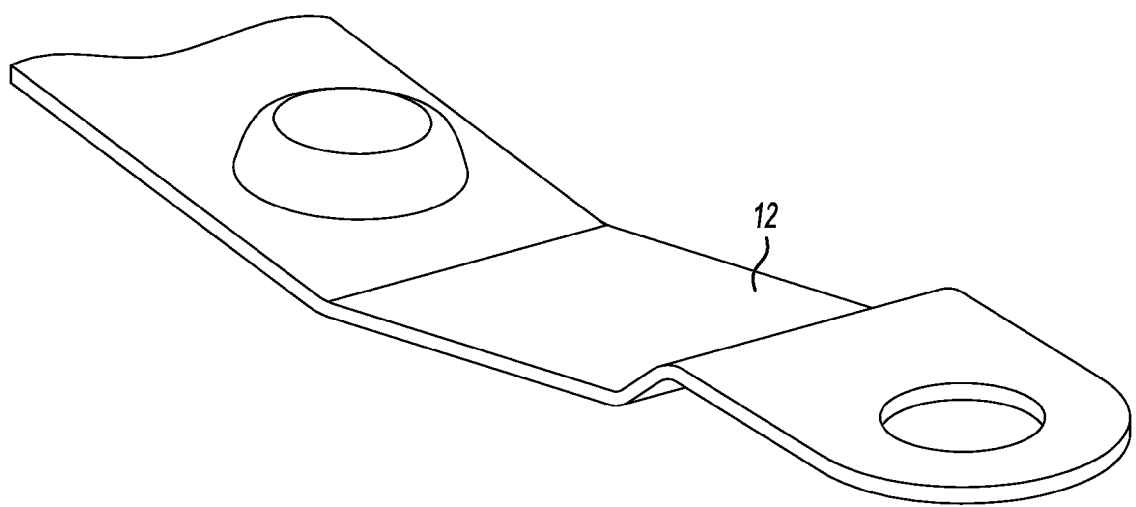
FIG. 7 is a view of an illustrative bracket attached to the cross-section shown in FIG. 6 in accordance with the present teachings.
Figure 8:
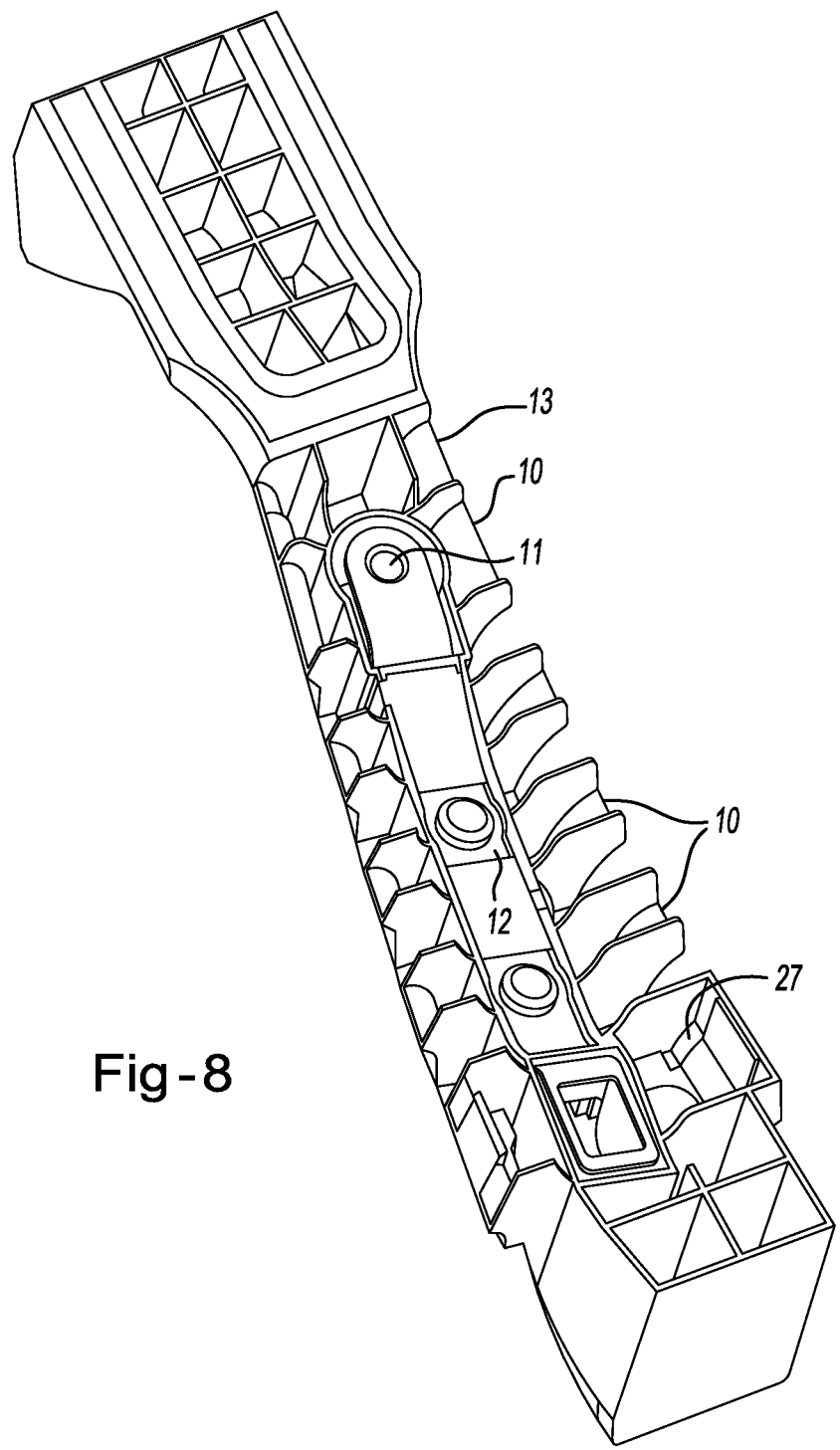
FIG. 8 is a perspective view of an illustrative reinforcement in accordance with the present teachings.
Figure 9:
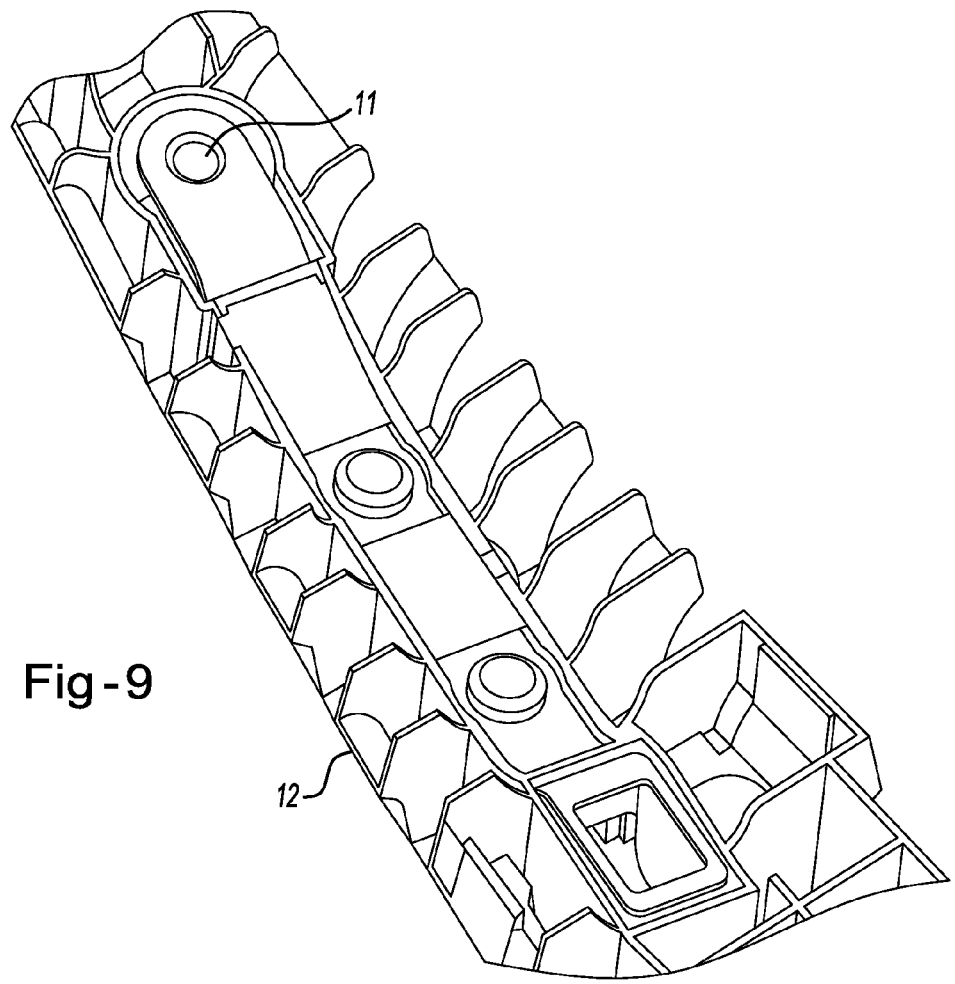
FIG. 9 is a perspective view of an illustrative reinforcement in accordance with the present teachings.

As shown for example in FIGS. 4 and 5, the reinforcement of the present invention may include a molded rib configuration 10 such as shown in U.S. Pat. Nos. 7,374,219; 7,160,491; 7,105,112; 6,467,834; and in commonly owned co-pending U.S. application Ser. No. 11/863,929, hereby incorporated by reference. The molded rib configuration 10 may include an interconnected network of ribs and may include one or more fasteners 11 (e.g., push-pin fasteners). The molded ribs may be arranged so that they are transverse to the longitudinal axis of the reinforcement structure. The arrangement of the transverse molded ribs may create a plurality of cavities 27 arranged along the reinforcement structure. Each cavity may contain a plurality of was such that at least one wall is formed by the localized reinforcement, the localized reinforcement having a u-shaped profile 36. As shown, for example, in FIG. 11, the reinforcement may further include one or more through-holes 16 through which fluids can drain (e.g., e-coat fluid), and one or more standoffs or lugs for providing space between the carrier and the vehicle cavity. The molded rib configuration may further include an expandable material 15. Examples of suitable reinforcements can be found, without limitation, in U.S. Pat. Nos. 6,953,219 and 6,467,834 hereby incorporated by reference.

As illustrated in FIGS. 4-9, the localized reinforcement 12 may also include one or more structures 11 for fastening the localized reinforcement to the base reinforcing portion or for fastening to any part of a vehicle, including but not limited to any vehicle bracket, mounting bracket, seat belt mechanism, seat belt retractor, pull handle bracket, roof rack, mirror bracket, sunroof bracket, bumper bracket, hinge component, chassis mount bracket, engine bracket, suspension component or radiator bracket. The structure may include a fastener such as a tree-fastener or a threaded screw fastener. As an example, a pushpin fastener may be used such as that disclosed in commonly owned U.S. application Ser. No. 12/405,481. The fastener may be capable of securing multiple layers or types of materials to a structure. Examples of suitable fasteners include mechanical fasteners, clips, snap-fits, screws, hooks, combinations thereof or the like. For attachment to a vehicle structure, the localized reinforcement may include formed openings cut to fit around tabs located on the vehicle structure in order to hold the reinforcement in place. Furthermore, it is contemplated that the one or more fasteners may be integrally formed of a singular material with the localized reinforcement or may be formed of a different material and may be permanently or removably attached to the localized reinforcement.

Figure 11:
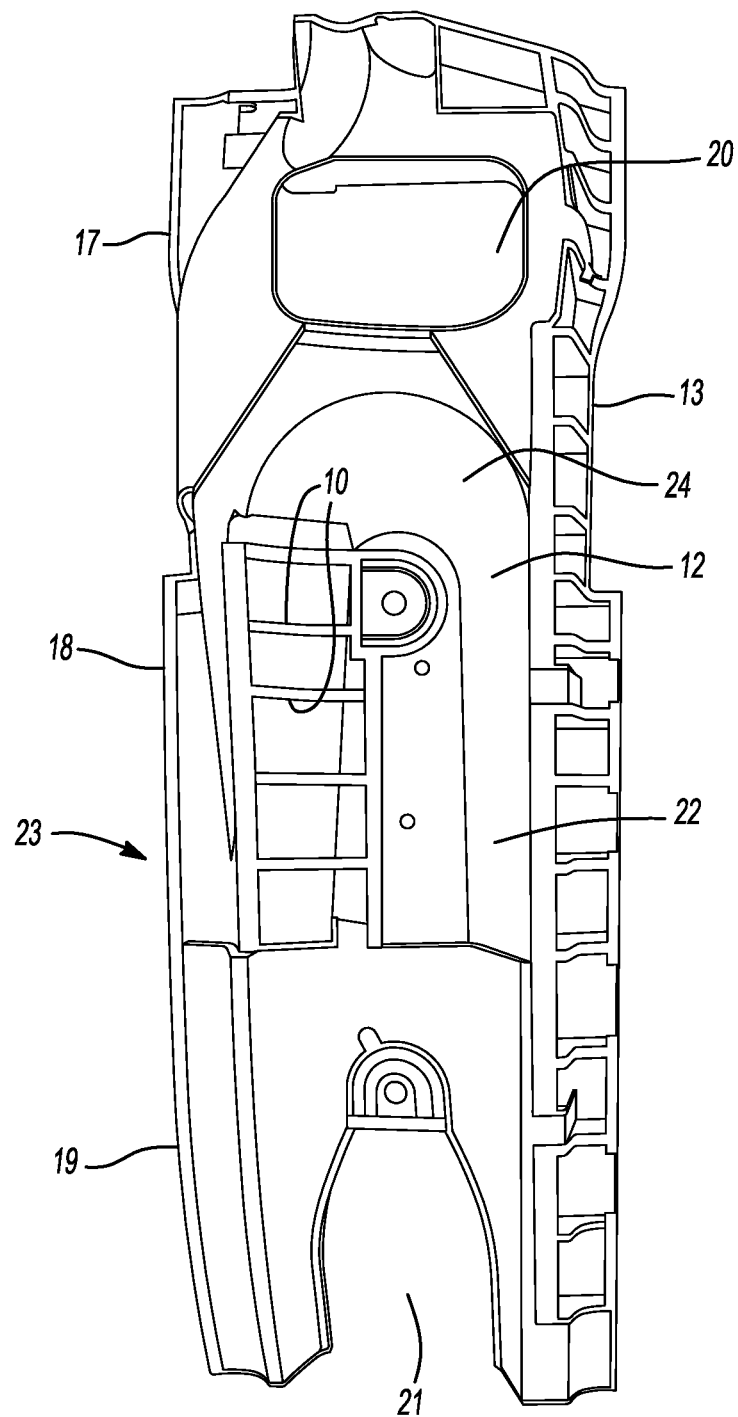
FIG. 11 is a perspective view of an illustrative reinforcement in accordance with the present teachings.

A shown in FIG. 11, the base reinforcing portion 1 may include a top portion 17, a middle portion 1 and a bottom portion 19. The middle portion may be in contact with the localized reinforcement 12, whereas the top portion and bottom portion may not be in contact with the localized reinforcement. The top portion may include a through-hole 20 for attaching the structural reinforcement 60 to a vehicle component. The bottom portion may also include a generally u-shaped cut-out area 21 for facilitating fit of the structural reinforcement within a cavity. The base reinforcing portion may also include a first surface 22 and a second surface 23 such that the localized reinforcement is placed in contact with the first surface. The first surface 22 may be curved in a concave form along the middle portion 1 of the base reinforcing portion. The localized reinforcement may also include a concave curved portion 24 so that it is complementary in shape to the middle portion of the base reinforcing portion. The localized reinforcement may cover only part of the first surface of the middle portion or may cover the entire first surface of the middle portion. The first surface, the second surface, or both may also include a plurality of ribs 10.

The expandable material may be a material that experiences expansion upon exposures to temperatures of between about 148.89° C. to about 204.44° C. (about 300° F. to about 400° F. (i.e., temperatures typically experienced in automotive painting or coating operations). The expandable material is typically foamed to a volume of at least 5% greater, at least 50% greater, at least 200% greater, at least 1000% greater, at least 2000% greater, at least 5000% greater or higher relative to the original unexpanded volume. It is also contemplated that the volume of the material may be less after activation due to curing (e.g., cross-linking) for foamed or unlearned versions of the expandable material.

Figure 10:
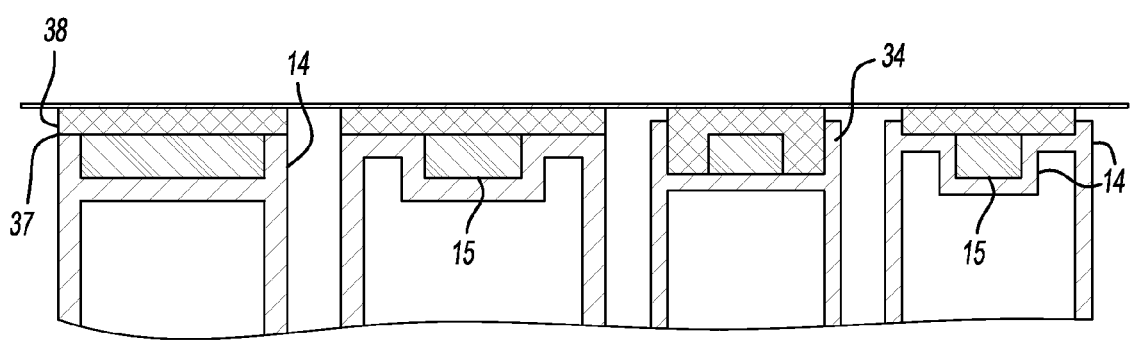
FIG. 10 is a diagram displaying location and movement of expanded material and adjacent extensions in accordance with the present teachings.

The base reinforcing portion may also be contacted with one or more expandable materials such as those disclosed in commonly owned U.S. Patent Publication No. 2008/0029200, hereby incorporated by reference. The expandable material may be an epoxy based material such as those disclosed in U.S. Pat. Nos. 5,884,960; 6,348513; 6,368,438; 6,811,864; 7,125,461; 7,249,415; and U.S. Patent Publication No. 2004/0076831, hereby incorporated by reference. The base reinforcing portion may also include one or more extensions 14 (as shown in FIG. 10). One function of the base reinforcing portion, in addition to providing structural reinforcement 50 to a vehicle upon placement in a vehicle cavity, is to provide a structural member that carries an actin table expandable material. Thus, the base reinforcing portion may include one or more outward facing surfaces onto which a layer of the expandable material is placed. The expandable material 15 is applied to the surface of the base reinforcing portion (prior to expansion) at such locations. The expandable material may be at least partially associated with the base reinforcing portion and the one or more extensions may cause the expandable material to expand vertically first and horizontally 38 only after the expandable material extends beyond the height 37 of the one or more extensions. Optionally, the direction of expansion may be controlled by one or more extensions, such as those disclosed in U.S. Pat. No. 6,941,719. The base reinforcing portion may also be composed of an expandable material, such as that disclosed in commonly owned U.S. Patent Publication No. 2007/0090560, hereby incorporated by reference. The base reinforcing portion and the expandable material may also be integrally formed of the same material.

The expandable materials according to the present invention can exhibit relatively high strength moduli while also exhibiting a high degree of ductility. The expandable material, particularly for certain combinations and amounts of ingredients (e.g., combination of certain amounts of adduct, amounts of impact modifier or both) as disclosed herein, can exhibit this increased ductility. These properties are clearly displayed using a conventional double lap shear test method. Such method is described in ASTM Method D3526-96. Type A configuration, using the following test parameters: test adherends are 0.060 inch thick, 1 inch×4 inch EG-60 metal pre-cleaned with acetone; each adhesive bond line is 3 mm; test overlap dimension is 1 inch×0.5 inch; test rate is 0.5 inch/minute. Such test method can be used to derive desirable properties such as the following: the ratio of the strain-to-break divided by the strain-at-peak stress, which is referred to herein as the ductility ratio; the energy-to-break, which is calculated as the area under the stress-strain curve using the strain at break as the terminal value for the area calculation.

Certain expandable materials formed in accordance with the present invention have exhibited a post-activation ductility ratio that is greater than about 2.0, more typically greater than about 2.5 and even possibly greater than about 2.8. Certain expandable materials formed in accordance with the present invention have exhibited a post-activation energy-to-break value of greater than about 550 Nmm, more typically greater than about 700 Nmm and possibly greater than about 750 Nmm when determined in accordance with the aforementioned test method.

The expandable material may be generally shaped in a rectangular or block configuration, but may also be shaped as needed or desired depending upon the configuration of the base reinforcing portion and/or localized reinforcement. Of course, it is contemplated that the material may be applied to the base reinforcing portion and/or localized reinforcement as a single piece (e.g., strip) or multiple pieces (e.g., strips). Upon expansion the expandable material may expand vertically initially until contacting any barrier at which point the expandable material may begin to expand in a horizontal direction. The expandable material may be able to expand into any gap with a width larger than about 1 mm. Further, the expandable materials of the present invention are capable of increasing the ductility of the base reinforcing portion. The expandable materials may act to distribute the load uniformly over the surface of the expandable material and in turn to transfer the load uniformly to the underlying base reinforcing portion and/or localized reinforcement, thereby exploiting the inherent strength of the base reinforcing portion and/or localized reinforcement.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural reinforcement for an automotive vehicle, comprising:
    i) an elongated metallic localized reinforcement having a longitudinal axis and being located in contact with a base reinforcing portion, the base reinforcing portion is an injection molded part having an interconnected network of ribs;
    ii) an expandable epoxy-based material at least partially covering the base reinforcing portion, the expandable material being a material that experiences expansion upon exposures to temperatures of between about 148.89° C. to about 204.44° C. for allowing the material to be activated by heat from an automotive painting or coating operation and foam to a volume of at least 50% higher relative to the original unexpanded volume, and to exhibit a post-activation ductility ratio that is greater than about 2.0 and
    wherein the localized reinforcement is made of a material that has a higher tensile strength and higher ductility than the material of the base reinforcing portion; and
    wherein the localized reinforcement has a generally unshaped profile in cross-section relative to its longitudinal axis, a curvature along its longitudinal axis and a wall thickness from about 0.5 mm to about 3.5 mm, and
    wherein the localized reinforcement is insert-molded such that material of the base reinforcing portion is applied over and around the localized reinforcement, while still having one or more exposed surfaces that are not concealed by the base reinforcing portion.

2. The reinforcement of claim 1, wherein the localized reinforcement is formed from a material selected from steel, aluminum, titanium, nickel, magnesium, an alloy, a transition metal or any combination thereof.

3. The reinforcement of claim 1, wherein the base reinforcing portion includes a curved first surface that contacts a first curved surface with the localized reinforcement.

4. The reinforcement of claim 2, wherein the base reinforcing portion includes a curved first surface that contacts a first curved surface with the localized reinforcement.

5. The reinforcement of claim 1, wherein the localized reinforcement is a composite material.

6. The reinforcement of claim 2, wherein the localized reinforcement is a composite material.

7. The reinforcement of claim 6, wherein the expandable epoxy based material after expansion covers the base reinforcing portion so that at least a portion of the expandable epoxy based material is in direct contact with an outer surface of the localized metallic reinforcement.

8. The reinforcement of claim 7, wherein the expandable material has a ductility ratio of about 2.5.

9. The reinforcement of claim 4, wherein the base reinforcing portion includes a top portion, a middle portion and a bottom portion and the localized reinforcement is located only in contact with the middle portion.

10. The reinforcement of claim 5, wherein the localized reinforcement includes multiple layers of the same material.

11. The reinforcement of claim 7, wherein the localized reinforcement includes multiple layers of the same dissimilar material.

12. The reinforcement of claim 2, wherein the located reinforcement includes multiple layers of the same material.

13. The reinforcement of claim 10, wherein the base reinforcing portion is a metal part, a composite part, a polymeric part, or any combination thereof.

14. The reinforcement of claim 13, wherein the base reinforcing portion is injection molded, extruded, die cast, or machined.

15. The reinforcement of claim 1, wherein the base reinforcing portion includes a first surface with a recessed area having one or more walls for containing the localized reinforcement.

16. The reinforcement of claim 15, wherein the walls of the recessed area are substantially planar.

17. The reinforcement of claim 1, wherein the localized reinforcement is in contact with a base reinforcing portion and the localized reinforcement is held in place by attachment, compressive forces, friction, adhesion, or any combination thereof.

18. The reinforcement of claim 17, wherein the localized reinforcement has a flexural modulus of at least 1.2.

19. The reinforcement of claim 18, wherein the base reinforcing portion includes a top portion, a middle portion and a bottom portion and the localized reinforcement is located only in contact with the middle portion.

20. The reinforcement of claim 14, wherein the expandable epoxy based material after expansion covers the base reinforcing portion so that at least a portion of the expandable epoxy based material is in direct contact with an outer surface of the localized metallic reinforcement.

* * * * *

UNITED STATES PATENT AND TRADEMARK OFFICE
CERTIFICATE OF CORRECTION

PATENT NO. : 9,150,001 B2  
APPLICATION NO. : 14/269262  
DATED : October 6, 2015  
INVENTOR(S) : Henry E. Richardson et al.

It is certified that error appears in the above-identified patent and that said Letters Patent is hereby corrected as shown below:

IN THE CLAIMS

Column 10, Claim 1, Line 37, "unshaped" should be "u-shaped"

Column 11, Claim 12, Line 8, "located" should be "localized"

Signed and Sealed this  
Eighth Day of March, 2016

Michelle K. Lee  
*Director of the United States Patent and Trademark Office*